June 21, 1938.  B. PUTTERMAN  2,121,099
MIRROR DEVICE
Filed Feb. 6, 1936
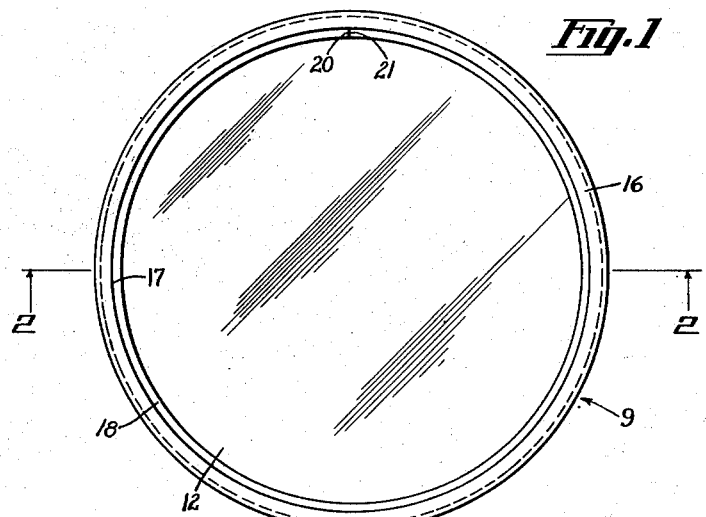
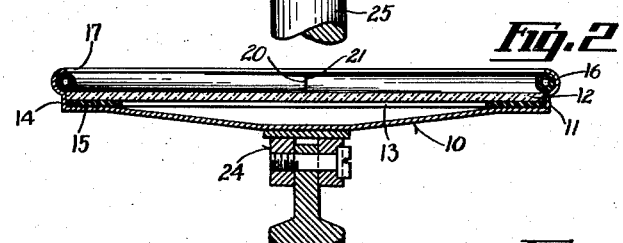
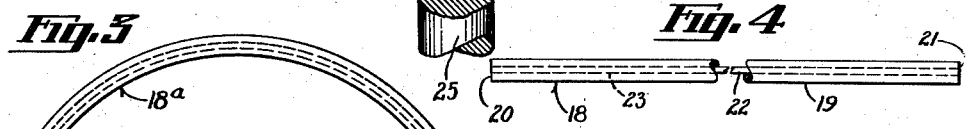
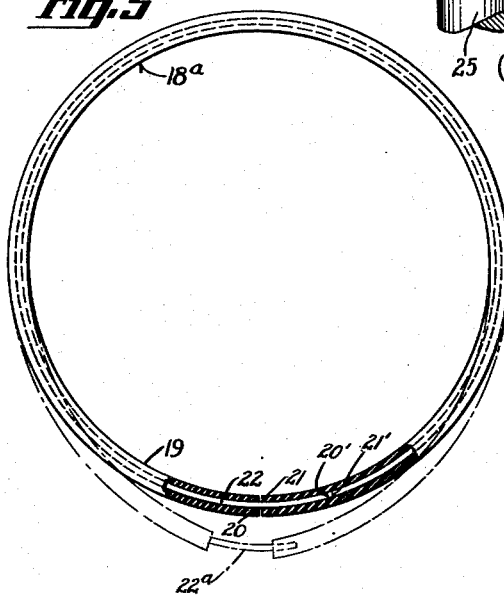
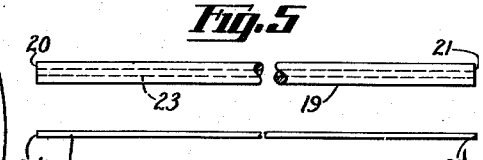
INVENTOR
BENJAMIN PUTTERMAN
BY William F. Vezner
ATTORNEY Patented June 21, 1938

2,121,099

UNITED STATES PATENT OFFICE 2,121,099

MIRROR DEVICE

Benjamin Putterman, Brooklyn, N. Y., assignor to Yankee Metal Products Corp., Norwalk, Conn., a corporation of New York Application February 6, 1936, Serial No. 62,600

1 Claim. (Cl. 88—96)

This invention relates to improvements in mirror devices, especially rear view mirror devices for use on automobiles, trucks, boats, and the like.

It is an object of the present invention to provide a mirror device which can be manufactured economically.

Most of the mirror devices now made and sold are so constructed that it is necessary to replace the complete mirror device if the glass section thereof becomes broken.

It is an important object of the present invention to provide a mirror device in which a broken glass mirror may be easily and quickly replaced with another unbroken one, thus making it possible to save the expense of the more costly mirror casing and the supporting parts, and to spare the trouble and time of taking a complete old mirror device from a car and replacing it with another. This latter factor, when complete replacement is necessary, often requires drilling entirely new sets of holes in an automobile fender or other parts of a car, and other like special operations.

A feature resulting from the attainment of this object is the provision of a deep casing adapted to receive the glass mirror and a novel cushioned ring adapted to hold it in place, said ring being adapted to permit easy replacement of a broken mirror.

Another related feature is the provision of the yielding retainer adapted to thoroughly seal the mirror in the casing so that water, moisture, and the like cannot seep into the case and adversely in back of the mirror.

Another associated feature is the provision of a cushioned support both in back and in front of the mirror, to lessen the possibility of it being cracked or broken.

In those few mirror devices heretofore provided in which it was possible to remove a broken mirror and replace it with an unbroken one, it was usual to provide a slit in the casing or a wide slot, and both of these types of structure had the disadvantages of greatly marring the appearance of the device which is usually mounted in a rather conspicuous place on an automobile, and had the further real disadvantage of allowing moisture, rain, and the like to get into the casing where it can adversely promote rusting and scaling of the silver or other mirror medium on the back of the glass.

In some other forms of mirror device heretofore provided, separate screws, screw and nut, separate pull-together rings, or the like were provided to draw the casing together or to otherwise hold the mirror in place. This type of structure, too, marred the appearance of the mirror device and made it necessary to use both a screw driver and wrench in many instances.

The present invention provides a mirror device which overcomes all of the aforementioned faults. Because the casing of the present invention does not have a narrow or wide slot, there is no opportunity for the water or moisture to seep into the case which normally holds a mirror. Also, the structure of the present invention is such that it is not necessary to use holding screws, nuts, or any like devices.

A yielding retainer, preferably of colored rubber, provided by the present invention, and fitting between the mirror and the shell or casing, gives a pleasant rounded contrasting finish which greatly improves the appearance of the complete device, and more particularly serves most effectively to advantageously hold the mirror in place and to prevent moisture from adversely seeping into the casing or in back of the mirror.

I am aware that efforts have been made heretofore to provide mirror devices in which a special ring of metal was provided with formed ends projecting through wide slots cut into the side of the mirror casing. However, these metal rings had the disadvantage of rusting very quickly because of the moisture and rain collecting in the nest therefore. The present invention provides a retainer which will not rust and will not have the adverse effect of the aforementioned structure.

In one form this is accomplished in the present invention by the provision of a retainer of yielding material such as rubber, and in some forms by a wire fully enclosed by a tubular rubber strip.

A supplemental feature is the provision of a length of rubber tubing and a strip of metal wire, of substantially the same length, so arranged that the wire projects from one end of the rubber tube and enters the other end of the rubber tube to make a complete endless annular retaining ring, adapted to serve as a yielding retainer for holding the mirror in the case.

In many of the previously proposed mirror devices, it was necessary to so construct the case that the mirror diameter was smaller than the inside diameter of the case, thereby allowing it to shift or rattle transversely in the case. Rattling of any kind in a car is always a very undesirable factor, and may result in the breaking of the mirror. These disadvantages are overcome by the present invention through the provision of a casing having a well or pocket of substantially the same diameter as the mirror in order to hold it in the case without transverse shifting or rattling. This pocket may also locate and support an underlying and yielding spacer forming a cushioned support for the mirror and supporting it against adverse longitudinal shock. The novel casing also has an overlying secondary pocket or channel of slightly larger diameter than the pocket, and with an inturned top edge for housing a yielding retaining ring and urging it into compressing relationship with the front face of the mirror.

Other objects, features, and advantages will appear hereinafter.

In the drawing:

Figure 1 is a front view of the mirror device.

Fig. 2 is a sectional view through the center of the mirror device, taken on line 2—2 in Fig. 1.

Fig. 3 is a detail view of the complete retaining ring provided by the present invention, in a rounded or formed condition.

Fig. 4 is a detail view of the retaining ring in straight or unformed condition.

Fig. 5 is a detail view of the yielding tube.

Fig. 6 is a detail view of the wire, adapted to fit into the yielding tube.

Referring now in detail to the drawing, which shows only the present preferred embodiments of the invention, there is shown a cupped or dished casing 10 having a well 11, adapted to locate and support a mirror 12, usually of glass, and an inner yielding spacer 13, such as a ring of rubber or the like. If preferred the spacer 13 may be a large disc without a center hole; however, for lighter weight and saving in material, it is preferably made in the form of a ring as shown.

This well 11 is preferably of the same diameter as the inner yielding member 13 and the mirror 12, or substantially so, in order to prevent the mirror from shifting or rattling transversely in the casing 10. Preferably the well 11 has a straight side wall 14 and a flat bottom 15, in order to provide a sturdy support for the glass mirror.

Overlying the well 11, yet coextensive and preferably integral therewith, the casing 10 is provided with a channel 16 which may be of semicircular shape, having a coextensive and inturned top edge 17 of substantially the same inside diameter as the inside diameter of the well 11, in order to pass the inner yielding member 13 and mirror 12, for assembly or for replacement. This channel 16 locates, houses, and supports a novel retainer 18, 18a, or 19 (see Figs. 4 and 3 respectively). Also, the channel 16 has an inner contour conforming substantially with the outside contour of the retaining ring. Preferably the upper edge 17 of the channel 16 is slightly closer to the top face of the mirror than the thickness or diameter of the retainer to normally press the retainer down upon the front face of the mirror 12 and hold it yieldingly against the inner yielding spacer 13.

The preferred form of retainer 18 comprises a tube 19 of yielding material, preferably rubber, as may be seen best in Fig. 5, of sufficient length so that ends 20 and 21 thereof come substantially into abutting relation when the retainer is placed into the channel 16 of the casing 10, as may be seen best at the top of Fig. 1, or by solid lines at the bottom of Fig. 3, and having a wire 22 as shown in Fig. 6, which is also preferably of the same length as the rubber tube 19. This wire 22 is simply slid lengthwise through a bore 23 in the tube 19 until ends 20' and 21' align with the ends 20 and 21 respectively of the tube, as is clearly apparent in Fig. 4. Since the wire has a normal tendency to straighten it urges and holds the tube 19 in the channel 16.

The wire may be omitted and the rubber retainer 19 alone squeezed into the channel 16 and onto the top or outer face of the mirror 12 to hold the latter in the casing. However, the wire within the retainer tube 19 represents a stronger and more satisfactory structure.

In setting up the present invention for use anywhere, any suitable clamping device 24 for securing the casing 10 on any suitable standard 25, having any conventional base plate or like structure (not shown) may be used for connecting it to an automobile fender or the like. Since these clamping and supporting elements are all well known, further illustration and discussion thereof seems unnecessary.

However, in order to complete the assembly in the casing 10, with the novel structure provided by the present invention, detailed discussion thereof will now be given. In order to complete the assembly within the casing 10 it is merely necessary to drop or place a flat spacer 13 within the well 11 so that it rests upon the flat wall 15, and to thereafter place a glass mirror 12 within the well 11 and on top of the spacer 13. Next, the yielding retainer 18, including the rubber tube 19 and wire 22 enclosed thereby, with the ends thereof in alignment, is set within the casing on top of the mirror 12 and is pushed into or curled into the channel 16 into the position shown in Figs. 1 and 2, whereupon the retainer 18 yielding urges the mirror into engagement with the flat ring 13 and serves to lock the mirror in the well 11 and casing 10. As will be apparent by viewing Figs. 1 and 2, because it may be variously shaped and colored, the rubber tube 19 may be used to impart a neat ornamental appearance to the mirror device. In addition, however, it very effectively seals the casing against the admission of water and moisture. Also, because no metal retaining parts are exposed at this point, there is no danger of rusting that would occur if a metal ring was used.

If the mirror 12 should be broken for any reason, it is a simple matter to remove the retainer 18 and replace a broken mirror 12 with an unbroken one, by merely inserting a screw driver or other pointed instrument under the top edge 17 and hook it in back of the ring 18 near either the point 20 or 21. After one of these points is brought out of the channel 16 it is an easy matter to grasp it and remove the complete retainer.

After an unbroken mirror 12 is placed into the case, the retaining ring 18 is again moved into the channel 16 in the manner hereinbefore described in order to complete the assembly. Therefore, it is a very easy matter to replace a broken glass in the mirror device 9 of the present invention without spoiling the appearance of the same and without replacing any of the costly casing or supporting parts, or of removing the standard from the automobile.

Fig. 3 shows a modified form of retainer 18a which is very similar in nearly every respect with the ring 18. This ring 18a may be made from the same tube 19 and same wire 22 as the assembled retaining ring 18. However, the assembly of the tube and wire is somewhat different since one end of the wire 22 is allowed to project a short distance beyond the end of the tube 19 (e. g. onehalf or three-quarters of an inch) to form a projection 22a while the other end of the wire falls short of the end of the tube approximately the same distance so that the normally exposed wire end or projection enters the opposed tube end or socket 19a therein a short predetermined extent, as shown clearly in Fig. 3, in order to form a complete and continuous annular retaining ring. This structure provides a sturdier and stronger retaining ring and is a structure preferably used in the large diameter mirror devices. However, it is somewhat harder to get into and out of the channel 16, and therefore in the smaller sizes the retaining ring 18 is preferably used.

Although a round casing 10 has been shown, this has been done mainly to clearly illustrate the invention, and it is well within the purview of the present invention to have oval and other shaped casings.

The well 11 may be made less deep and the flat yielding member 13 dispensed with for economy; but, its use is preferred since the thorough cushioning of the mirror on two sides minimizes the likelihood of the mirror breaking. Also, the tube 19 of circular cross section and cooperating semicircular channel 16 may be of different cross section or contour.

Other variations and modifications may be made within the scope of this invention, and portions of the improvements may be made without others.

Having thus described the invention, what is claimed as new is:

In a mirror device the combination of a casing having a well, and a channel of greater diameter than said well, the channel having an inturned top edge of substantially the same diameter as the well; a mirror in said well having a diameter substantially equal thereto; a spacer of yielding material having a diameter substantially equal to and positioned in back of said mirror; a rubber tube having a wire therein projecting from one end thereof and having a socket at the other end to receive the projecting wire, said rubber tube being insertable into said channel to yieldingly maintain said mirror in said well and against said spacer.

BENJAMIN PUTTERMAN.